Patented Sept. 19, 1922.

1,429,830

UNITED STATES PATENT OFFICE.

RICHARD E. BANKS, OF WASHINGTON, DISTRICT OF COLUMBIA.

STORAGE-BATTERY ELECTROLYTE.

No Drawing.    Application filed June 2, 1922. Serial No. 565,446.

*To all whom it may concern:*

Be it known that I, RICHARD E. BANKS, a citizen of United States, residing at Washington, District of Columbia, have invented new and useful Improvements in Storage-Battery Electrolytes, of which the following is a specification.

The present invention relates to a novel and highly efficient storage battery electrolyte, which is suitable for use in any of the ordinary types of storage batteries, namely, those having lead electrodes. The electrolyte of this invention contains iron sulfate, aluminum sulfate, copper sulfate, sulphuric acid and water, and preferably chlorin water, although in some cases the last mentioned ingredient can be omitted or other materials substituted therefor.

In making up the electrolyte, I preferably proceed as follows: 3 gallons of strong sulphuric acid (preferably 1.835 specific gravity) are mixed with water in amount sufficient to reduce the gravity to 1.200. About 6 gallons of water may be used. Then an additional 7 gallons of the strong sulphuric acid are added to the liquid well mixed during the addition of this acid.

A separate solution is made by mixing 10 pounds of iron sulfate, preferably ferric sulfate, with 9 gallons of water, adding a solution of one pound of aluminum sulfate in 4 gallons of water, adding one pound of copper sulfate dissolved in one gallon of water, and preferably adding two ounces of chlorin water, (i. e., saturated solution of chlorin in water). This solution containing the iron sulfate, aluminum sulfate, copper sulfate and chlorin water, is then mixed with the mixed sulphuric acid, preferably while the latter is hot. It is well understood that the mixing of the sulphuric acid with the water and then adding more concentrated sulphuric acid to the same heats up the mixture.

A sufficient amount of water is then added to bring the gravity of the mixture down to 1.250 specific gravity (25 gallons of water ordinarily being required). The liquid is then ready for use as an electrolyte in a storage battery and can be put up into bottles, jugs or the like and placed on the market without any further treatment. It will be understood that the sulphuric acid is preferably quite pure, although certain impurities which might be present therein, such as lead sulfate will be largely precipitated during the operation of diluting the same or will settle out after the mixture has been completed. It is not necessary to employ distilled water for making up the solutions or for making up the electrolyte, but water which is substantially free from injurious materials, such as nitrates and nitrites, should of course be employed.

The use of this solution as an electrolyte in lead plate storage batteries has been found to very considerably increase the efficiency of the battery, and the battery will last much longer when this solution is used, than when ordinary sulphuric acid and water mixture are used.

The above batch of material will make about something over 50 gallons of the electrolyte.

I claim:

1. A storage battery electrolyte comprising sulfates of iron, aluminum and copper, sulfuric acid and water.

2. A storage battery electrolyte, comprising large quantities of water and sulfuric acid, a smaller amount of ferric sulfate, still smaller amounts of copper sulfate and aluminum sulfate.

3. A storage battery electrolyte containing approximately the following ingredients:—sulphuric acid of 1.835 specific gravity about 10 gallons; ferric sulfate, about 10 pounds; aluminum sulfate, about 1 pound; copper sulfate, about 1 pound; chlorin water, about 2 ounces; together with a sufficient amount of water to give a specific gravity of about 1.25.

4. A storage battery electrolyte, comprising large quantities of water and sulfuric acid, a smaller amount of ferric sulfate, still smaller amounts of copper sulfate and aluminum sulfate, and a very small amount of free chlorin.

In testimony whereof I affix my signature.

RICHARD E. BANKS.